T. M. JONES.
AGRICULTURAL IMPLEMENT.
APPLICATION FILED APR. 18, 1921.
1,400,073.
Patented Dec. 13, 1921.
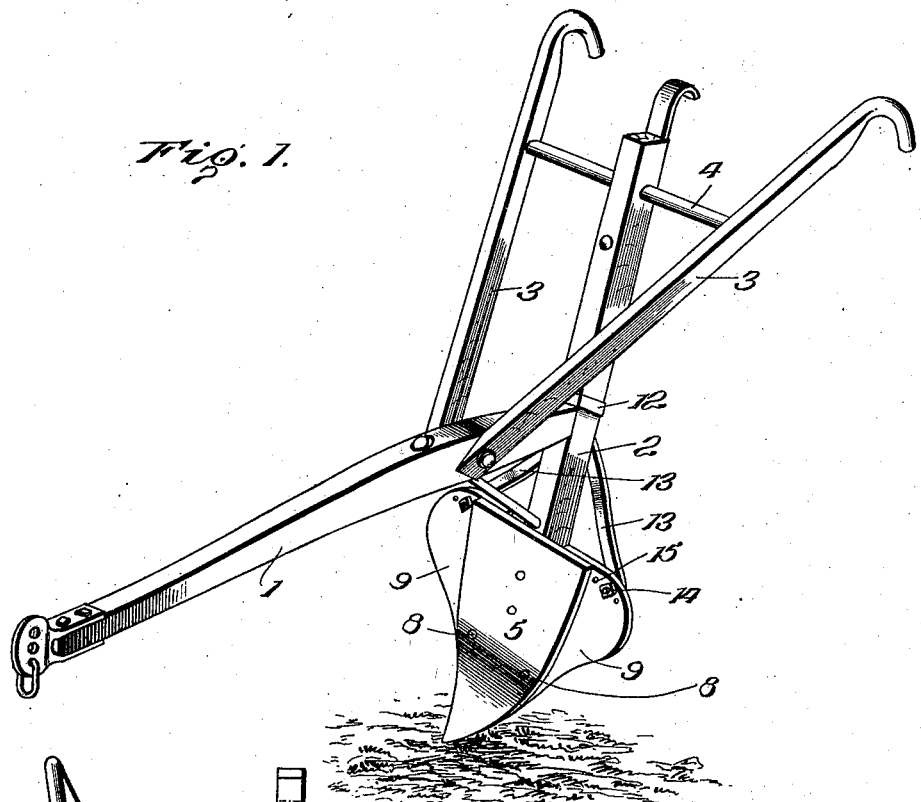
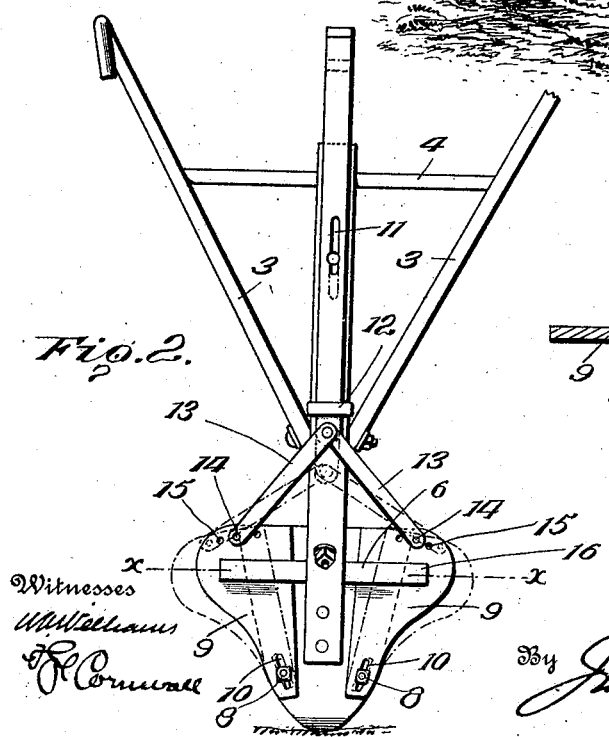
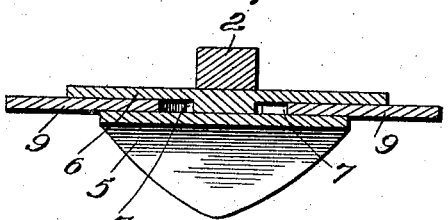

UNITED STATES PATENT OFFICE.

THOMAS M. JONES, OF CHATEAUGAY, NEW YORK.

AGRICULTURAL IMPLEMENT.

1,400,073.          Specification of Letters Patent.    Patented Dec. 13, 1921.

Application filed April 18, 1921. Serial No. 462,373.

*To all whom it may concern:*

Be it known that I, THOMAS M. JONES, a citizen of the United States, and a resident of Chateaugay, in the county of Franklin and State of New York, have invented certain new and useful Improvements in Agricultural Implements; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in agricultural implements.

The prime object of the invention is to provide an implement for throwing the earth up in rows to protect the roots of plants.

The invention also relates to the specific details of construction and arrangement of parts which will be hereinafter described and particularly pointed out in the claims.

In the drawings:—

Figure 1 is a perspective view of my improved implement, the wings being shown in extended position.

Fig. 2 is a rear view, the wings being shown in drawn inwardly position.

Fig. 3 is a detail cross section on the line x—x of Fig. 2.

The numeral 1 indicates a plow beam, provided at its rear end with a standard 2. Handles 3 are also secured to the beam and are braced to the standard by a cross bar 4.

To the lower portion of the standard is bolted a cultivator blade 5, the lower end of which is curved forwardly and is pointed. That part of the cultivator blade above the curved pointed portion is substantially flat, and secured between said flat portion and the standard 2 is the central portion of a horizontal guide bar 6 the ends beyond the central portion being reduced and hence spaced from the rear surface of the cultivator blade as shown at 7.

To the rear of the cultivator blade, and just above the forwardly curved pointed end, are two pivots 8—8, on which are mounted two substantially flat wings 9—9, the upper ends of which are in alinement with the top of the blade. Each wing 9, is provided with a slot 10, to receive the pivot 8. The lower end of each wing is reduced, so as to coincide with the edge of of the cultivator, when in drawn inwardly position. The wing is curved outwardly to provide a rounded protuberance which projects beyond the edge of the cultivator when the wings are drawn inwardly.

An operating lever is located on the rear of the extended portion of the standard, and is provided with a slot 11, through which a headed pin passes to act with a band 12, as a guide. Pivoted to the lower end of the operating lever are two diverging links 13—13, the lower ends of which are pivoted at 14—14, to the upper portions of the two wings 9—9.

In order to provide adjustment for the wings, the pivots 14—14 may pass through any one of the openings 15.

The wings are held supported in relation to the cultivator by the horizontal guide bar 6, which acts to brace said wings when the implement is in operation.

The parts being assembled as described, if it be desired to employ the implement as an ordinary cultivator, the operating handle is raised, which through the medium of the diverging links will rock the wings on their pivots and draw inwardly their lower portions in behind the cultivator blade, while the upper ends will extend beyond the edges of said blade and form a continuation thereof, the wings operating in the guideway formed between the rear cross bar and the cultivator blade.

Now if it be desired to employ the implement to cover the rows of plant roots, such for instance as potatoes or the like, the operating handle is lowered and the links will rock the wings outwardly on their pivots, thereby increasing the front operating surface as shown in Fig. 1.

When the wings are in this position, obviously the lower reduced portions are brought out beyond the edges of the blade and they form a combination of the lower tapered edges of said blade. The result is that the soil is caused to turn up and out from the time it is lifted by the point and is, because of the flat surface formed by the blade and wings, thrown over on each side, the horizontal bar acting as a substantial brace to resist the strain.

By providing the flattened cultivator blade and wings, the soil is thrown high up on the hills, and at the same time the wings have a substantial guideway when being swung inwardly or outwardly. Furthermore the construction is such that the operator can manipulate the wings while using the implement, and at any point they are set, they will be braced.

I claim as my invention:—

1. In combination, a beam, a standard secured to the beam, a cross bar secured to the standard, a cultivator blade attached to the lower end of the standard and bearing against the cross bar, wings pivoted to the cultivator blade, said wings fitting between the blade and the cross bar, the cross bar serving to brace the upper portion of the wings, an operating lever on the standard, and diverging links pivoted to the operating lever and the upper ends of the two wings.

2. In combination, a beam and a standard, a cross bar secured to the standard, a cultivator blade secured to the front of the standard and bearing against the cross bar, the cross bar having reduced ends to form with the cultivator blade guides on opposite sides of the standard, wings pivoted to the cultivator blade and operating in the guides, the cross bar serving to brace the upper portion of the wings, diverging links pivoted to the upper end of the wings, an operating lever pivoted to diverging links to swing the wings toward and from the standard.

In testimony whereof I claim the foregoing as my invention and sign my name.

THOMAS M. JONES.